United States Patent [19]
Honda

[11] Patent Number: 5,226,669
[45] Date of Patent: Jul. 13, 1993

[54] GAS GENERATOR FOR AIR BAG SYSTEM

[75] Inventor: Kiyoshi Honda, Wako, Japan

[73] Assignee: Honda Giken Kogyo Kabushiki Kaisha, Tokyo, Japan

[21] Appl. No.: 959,581

[22] Filed: Oct. 13, 1992

[30] Foreign Application Priority Data

Nov. 7, 1991 [JP] Japan .................................. 3-291416

[51] Int. Cl.$^5$ .......................................... B60R 21/26
[52] U.S. Cl. .................................... 280/737; 422/305; 422/165; 422/166; 222/3; 102/531
[58] Field of Search ....................... 422/305, 165, 166; 280/736, 737, 741, 742; 102/530, 531; 222/3

[56] References Cited

U.S. PATENT DOCUMENTS

| | | | |
|---|---|---|---|
| 4,981,534 | 1/1991 | Scheffe | 280/741 |
| 5,031,932 | 7/1991 | Frantom et al. | 280/737 |
| 5,033,772 | 7/1991 | Frantom et al. | 280/737 |
| 5,076,607 | 12/1991 | Woods et al. | 280/737 |
| 5,131,680 | 7/1992 | Coultas et al. | 280/741 |

*Primary Examiner*—Robert J. Warden
*Assistant Examiner*—Laura E. Collins
*Attorney, Agent, or Firm*—Armstrong, Westerman, Hattori, McLeland & Naughton

[57] ABSTRACT

First and a second sealing layers are provided inside an inner periphery of a casing layer having a plurality of gas ejecting bores in its outer peripheral wall, and a gas-generating agent is mounted between the sealing layers, while a compressed gas is filled inside the second sealing layer. When the gas-generating agent is fired due to a collision of a vehicle, the first sealing layer is cleaved in a region of the gas ejecting bores by the pressure of a generated combustion gas and, then, the second sealing layer is cleaved likewise in a region of the gas ejecting bores by the pressure of the compressed gas, thereby permitting the compressed gas to be ejected uniformly from the plurality of gas ejecting bores into an air bag. In this case, a reduction in temperature of the compressed gas due to an adiabatic expansion thereof is compensated for by mixing of the compressed gas with the combustion gas, thereby enabling an efficient expansion of the air bag.

2 Claims, 3 Drawing Sheets

GAS GENERATOR FOR AIR BAG SYSTEM

BACKGROUND OF THE INVENTION

1. Field of the Invention

The present invention relates to a gas generator for generating a high pressure gas for expanding an air bag in an air bag system mounted in a vehicle or the like, and particularly, to a gas generator of the type which uses both of a compressed gas previously charged and a combustion gas generated from a combustible substance, in combination.

2. Description of the Prior Art

Conventionally, there has commonly been used a common type of a gas generator for an air bag system, which contains a pellet-shaped or grain-shaped gas-generating agent filled in a cylindrical casing. With such gas generator, the gas-generating agent is ignited and fired by an electrical or mechanical igniting device on the basis of an output signal from a sensor which detects the collision of a vehicle, and the generated combustion gas is ejected into the air bag through a plurality of gas ejecting bores provided in a peripheral wall of the casing.

With a gas generator using only the combustion gas as in such gas generator, however, it is necessary to mount a cooler for cooling a high temperature generated combustion gas and a filter for removing a solid residue or cinder of the gas-generating agent contained in the combustion gas. This causes a problem that the structure of the gas generator is complicated, resulting an increase in cost.

Thereupon, a gas generator has been proposed which includes a compressed gas previously filled in the casing for expanding the air bag, and a small amount of gas-generating agent incorporated in the casing (for example, Japanese Patent Publication No. 578/79). With such gas generator, the gas-generating agent is ignited and fired on the basis of an output signal from a collision sensor, and at the same time, an end of the casing is cleaved by a detonator, thereby permitting the compressed gas and the combustion gas from the gas-generating agent to be mixed with each other and ejected in the form of the mixture. If the compressed gas and the combustion gas are used in combination in this manner, the compressed gas is heated moderately by mixing of the compressed gas with the high temperature combustion gas and hence, a reduction in temperature due to an adiabatic expansion of the compressed gas upon ejection thereof from the casing can be compensated for, thereby avoiding the loss of gas volume, but also the gas-generating agent may be of a small amount and for this reason, the need for the cooler and the filter can be eliminated, leading to a simplified structure.

In the gas generator using the combustion gas and the compressed gas in combination, as described above, the detonator is provided at the end of the casing for cleaving the gas ejecting bores, and moreover, the compressed gas and the combustion gas are ejected from only the end of the casing. Therefore, there is a problem that if no gas diffusing member such as a baffle plate is provided opposed to the gas ejecting bores, the gas cannot be supplied equally into the air bag.

SUMMARY OF THE INVENTION

Accordingly, it is an object of the present invention to provide a gas generator of a type using a compressed gas and a combustion gas in combination, wherein a plurality of gas ejecting bores are cleaved or opened at an outer periphery of a casing without use of a detonator, so that the gas can be equally diffused into an air bag.

To achieve the above object, according to a first aspect and feature of the present invention, there is provided a gas generator for an air bag system, comprising a cylindrical casing provided in a peripheral wall thereof with a plurality of gas ejecting bores, a first sealing layer laminated on an inner surface of the peripheral wall of the cylindrical casing to cover the gas ejecting bores, a second sealing layer provided inside the first sealing layer at a predetermined distance, a combustible substance disposed between the first and second sealing layers and fired in accordance with an output signal from a collision sensor to cleave the first sealing layer in a region of the gas ejecting bores by the pressure of a generated gas, and a compressed gas airtightly charged in the cylindrical casing inwardly of the second sealing layer and having a pressure sufficient to cleave the second sealing layer in the region of the gas ejection bores.

With the first feature of the present invention, the first sealing layer is cleaved by the pressure of the combustion gas of the gas-generating agent, and the second sealing layer is cleaved by the pressure of the compressed gas. The compressed gas and the combustion gas are equally ejected from a plurality of gas ejecting bores provided in the cylindrical casing, so that the air bag can be efficiently expanded. Moreover, because a means, such as a detonator is not required for cleavage of the first and second sealing layers, it is possible to provide a simplified structure and to reduce the number of parts.

In addition to the first feature, the present invention has a second feature that the cylindrical casing and the first and second sealing layers are formed from a piece of metal sheet wound into a roll.

With the second feature of the present invention, the reductions in number of parts and in manufacture cost are achieved.

The above and other objects, features and advantages of the invention will become apparent from the following description of the preferred embodiments, taken in conjunction with the accompanying drawings.

BRIEF DESCRIPTION OF THE DRAWINGS

The drawings illustrate a preferred embodiment of the present invention; wherein.

DESCRIPTION OF THE PREFERRED EMBODIMENT

The present invention will be described by way of a preferred embodiment in connection with the accompanying drawings.

Figure 1:
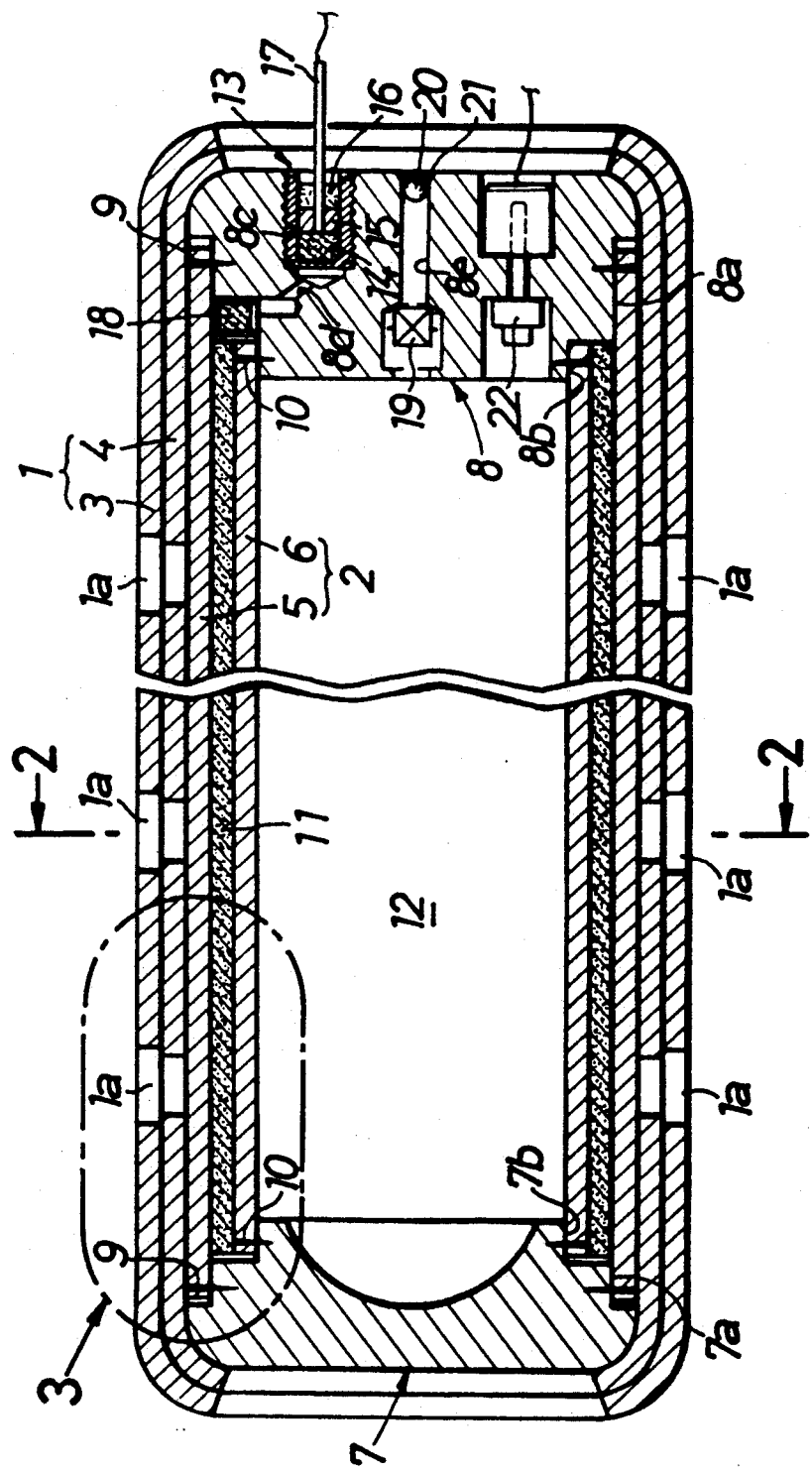
FIG. 1 is a longitudinal sectional view of a gas generator.
Figure 2:
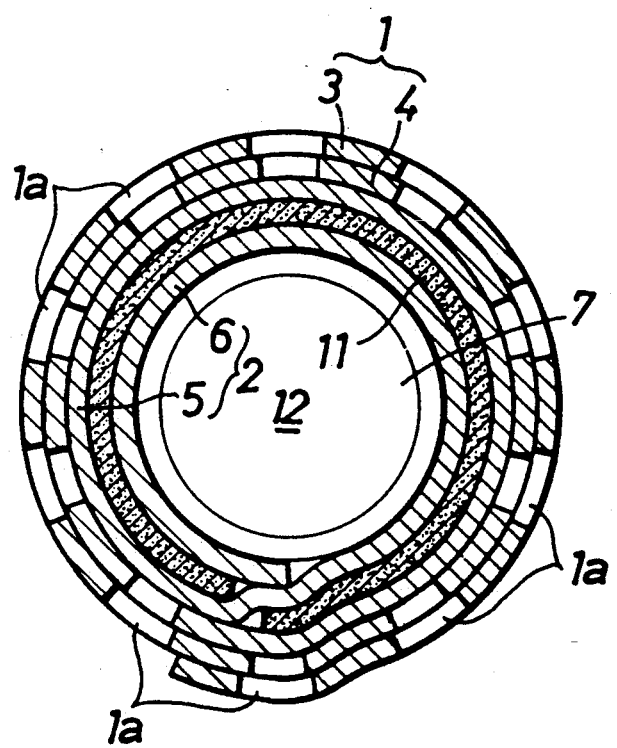
FIG. 2 is a sectional view taken along a line 2—2 in FIG. 1.

Referring to FIGS. 1 and 2, a gas generator comprises a piece of rectangular metal sheet wound in approximately four rotations into a roll and includes a casing layer portion 1 and a sealing layer portion 2. More specifically, the winding is conducted such that an outermost first casing layer 3 comes into close contact with a next-outermost second casing layer 4 to form the casing layer portion 1, and a first sealing layer 5 wound to come into close contact with an inner side of the second casing layer 4 and a second sealing layer 6 wound with a predetermined gap inside the first sealing layer 5 form the sealing layer portion 2. The manufacturer cost of the gas generator is substantially reduced by the simultaneous formation of the casing layer portion 1 and the sealing layer portion 2 from the piece of metal sheet, as described above.

A pair of disk-like mirror plates 7 and 8 are fitted into openings at opposite ends of the casing layer portion 1, respectively and secured by bending end edges of the casing layer portion 1 inwardly. End edges of the first sealing layer 5 are engaged with radially outer steps 7a and 8a formed in the mirror plates 7 and 8, respectively, and air-tightly welded thereto by an electronic beam welding 9. End edges of the second sealing layer 6 are engaged with radially inner steps 7b and 8b of the mirror plates 7 and 8 and air-tightly welded thereto by an electronic beam welding 10.

A plurality of axially and circumferentially arranged gas-ejecting bores 1a are formed through the casing layer portion 1 comprised of the first and second casing layers 3 and 4. Inner ends of the gas-ejecting bores 1a are closed by the first sealing layer 5. A film-shaped or a foil-shaped gas-generating agent 11 is filled in a cylindrical space defined between the first and second sealing layers 5 and 6 of the sealing layer portion 2. The main purpose of the gas-generating agent 11 is to heat a compressed gas which will be described, rather than to expand an air bag directly by the combustion thereof. For this reason, a small amount of the gas-generating agent 11 suffices, and rather, it is important that no harmful substances and solid residual substances or cinder are contained in a combustion gas generated by such agent 11.

A compressed gas 12, having a pressure of about 200 kg/cm$^2$, is filled in a sealed space defined between the second sealing layer 2 and the pair of mirror plates 7 and 8. A preferable gas, as such compressed gas 12, is argon gas. This is because argon gas has conditions that makes it difficult to react with the combustion gas from the gas-generating agent 11, that is, it has a larger molecular weight sufficient to be difficult to leak into the atmosphere, through the casing layer 1. Argon is included in a large amount in air and harmless to a human body, and is available at a low price. The pressure of the compressed gas 12 is set at such a value that it is insufficient to simultaneously cleave the two first and second sealing layers 5 and 6 which are superposed in a region of the gas ejecting bores 1a of the casing layer 1, but sufficient to cleave the single second sealing layer 6.

An igniting device 13 is provided in the mirror plate 8 and is comprised of an ignitor 14 mounted in a recess 8c defined in an outer surface of the mirror plate 8, a header 15, a high frequency filter 16, and a pin 17 connected to the ignitor 14. A firing agent 18 is mounted at the step 8b of the mirror plate 8, adjacent the gas-generating agent The firing agent 18 and ignitor 14 are interconnected through a propagating path 8d.

A compressed gas introducing path 8e is formed in the mirror plate 8. A check valve 19 is provided at an inner end of the introducing path 8e and is operative when the compressed gas 12 is introduced. After the introduction of the compressed gas 12, a sealing ball 20 is press-fitted into an outer end of the compressed gas introducing path 8e and welded thereto by a TIG welding 21. A pressure sensor 22 is also provided in the mirror plate 8 for monitoring the pressure of the compressed gas 12.

The operation of the embodiment of the present invention, having the above-described construction, will be described below.

When the collision of a vehicle is sensed by a sensor, an electric current flows from an ignition circuit in an air bag system to the pin 17 of the igniting device 13, thereby igniting the ignitor 14 by the heating of a resistor or by an electric spark. A combustion gas from the ignitor 14 fires the firing agent 18 through the propagating path 8d, and a combustion gas, from the firing agent 18, fires the gas-generating agent 11 mounted between the first and second sealing layers 5 and 6.

Figure 3A:
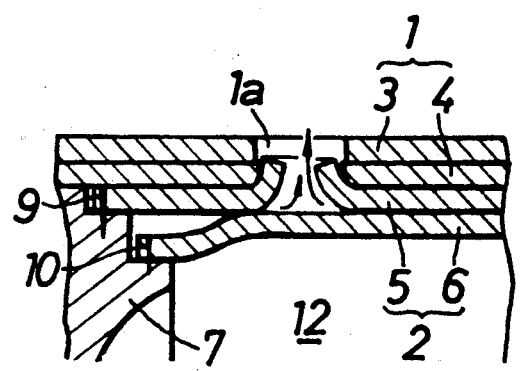
FIGS. 3A and FIG. 3B are enlarged sectional views for explaining the function of the gas generator of the invention.

The pressure of the combustion gas generated from the combustion of the gas-generating agent 11 urges the first sealing layer 5 radially outwardly and also urges the second sealing layer 6 radially inwardly. At this time, because the high pressure compressed gas 12 is filled inside the second sealing layer 6, the pressure of such combustion gas is received by the pressure of the compressed gas 12, so that the second sealing layer 6 cannot be cleaved. However, the atmospheric pressure acts on the outer surface of the first sealing layer 5 through the gas-ejecting bores 1a and, hence, the first sealing layer 5 is cleaved in the area of the gas-ejecting bores 1a by the pressure of such combustion gas, as shown in FIG. 3A.

Figure 3B:
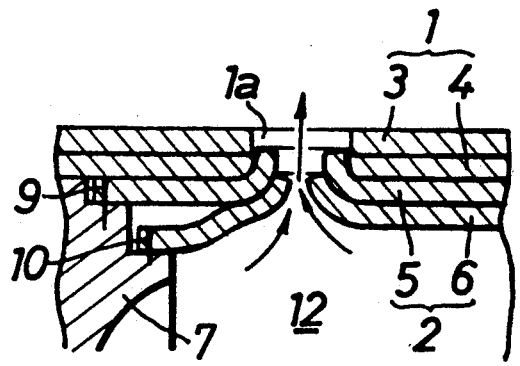

When the first sealing layer 5 is cleaved, the combustion gas is ejected from the gas-ejecting bores 1a into the air bag, and at this time, the atmospheric pressure acts on the outer surface of the second sealing layer 6 through the gas-ejecting bores 1a. As a result, the second sealing layer 6, which cannot withstand the pressure of the compressed gas 12, is cleaved in the region of the gas-ejecting bores 1a, as shown in FIG. 3B, and the compressed gas 12 is equally ejected from the plurality of gas-ejecting bores 1a into the air bag to rapidly expand the air bag.

The compressed gas 12, ejected from the gas-ejecting bores 1a, is reduced in temperature due to an adiabatic expansion, causing a loss of volume, but such compressed gas 12 is mixed with the combustion gas of a high temperature (about 1000° C.) from the gas-generating agent 11 to rise in temperature, thereby compensating for the loss of volume as a result of the adiabatic expansion of the compressed gas 12. This enhances the expanding performance of the air bag. By using the compressed gas 12, and the combustion gas from the gas-generating agent 11 in combination, in the manner, the amount of the compressed gas 12 used can largely be decreased as compared with the case where only the compressed gas 12 is used.

Although the embodiment of the present invention has been described in detail, it will be understood that the present invention is not limited to the above-described embodiment, and various minor modifications may be made without departing from the scope of the present invention defined in the accompanying claims.

What is claimed is:

1. A gas generator for an air bag system, comprising
   a first cylindrical casing having a peripheral wall with a plurality of gas ejecting bores,
   a first sealing layer laminated on an inner surface of a peripheral wall of said first cylindrical casing and covering said gas ejecting bores of said first cylindrical casing, and a second sealing layer positioned inside and spaced from said first sealing layer at a predetermined distance, a combustible substance disposed between said first and second sealing layers and fired by an output signal from a collision sensor to cleave said first sealing layer in a region of said gas ejected bores by pressure of a generated gas, and a compressed gas air-tightly charged in said first cylindrical casing, inwardly of said second sealing layer, and having a pressure sufficient to cleave said second sealing layer in the region of said gas ejecting bores.

2. A gas generator for an air bag system according to claim 1, wherein said first cylindrical casing and said first and second sealing layers are formed from a piece of metal sheet wound into a roll.

* * * * *